United States Patent [19]
Whitenight

[11] Patent Number: 5,490,814
[45] Date of Patent: Feb. 13, 1996

[54] POWER TRANSMISSION SHEAVE

[75] Inventor: Donald R. Whitenight, Beaver Dam, Wis.

[73] Assignee: Deere & Company, Moline, Ill.

[21] Appl. No.: 428,998

[22] Filed: Apr. 26, 1995

[51] Int. Cl.⁶ ................................. F16H 57/00
[52] U.S. Cl. ............................. 474/92; 474/188
[58] Field of Search ............................. 474/92, 175, 183, 474/188, 189

[56]         References Cited
         U.S. PATENT DOCUMENTS

| | | | |
|---|---|---|---|
| 36,318 | 8/1862 | Woodworth | 474/175 X |
| 555,924 | 3/1896 | Brigel . | |
| 785,257 | 3/1905 | Gardner | 474/183 |
| 1,335,421 | 3/1920 | Black | 474/92 X |
| 1,847,177 | 3/1932 | Freedlander . | |
| 2,074,199 | 3/1937 | Arnold | 474/175 |
| 2,176,335 | 10/1939 | Gray | 74/229 |
| 2,337,308 | 12/1943 | Buote | 474/175 |
| 2,371,283 | 3/1945 | Collier | 474/175 |
| 2,647,409 | 8/1953 | Keim | 74/219 |
| 3,188,775 | 6/1965 | Cosmos | 474/188 X |
| 3,763,714 | 10/1973 | Kahmann | 474/175 |
| 4,413,981 | 11/1983 | White et al. | 474/175 X |
| 4,509,933 | 4/1985 | Miranti et al. | 474/93 |
| 4,913,687 | 4/1990 | Soots | 474/167 |

*Primary Examiner*—Roger J. Schoeppel

[57]                   ABSTRACT

A sheave structure adapted to prevent the build-up of soil and other foreign materials in the v-grooves of sheaves utilized with ground engaging implements such as rotary tillers is provided. The sheave is constructed of mating halves, which when joined form a sheave with a v-groove that includes circumferentially spaced apart openings in the v-groove apex, below the belt contact area of the flanges. The openings are provided adjacent to, but below the belt contact area so that the belt pushes against any materials that collect in the v-groove. In this way, the belt serves to break apart the materials and push them through the openings. With this structure, accumulations of materials in the sheave are minimized, belt contact with the sheave flanges is improved and power transmission is enhanced.

11 Claims, 5 Drawing Sheets

POWER TRANSMISSION SHEAVE

BACKGROUND OF THE INVENTION

1. Field of the Invention

The present invention relates generally to implements powered by v-belts and more specifically to sheaves which are used with v-belt drives.

2. Description of the Related Art

Earth working implements such as rotary tillers are frequently utilized with vehicles such as Lawn and Garden Tractors. It is common for such tractors to power these implements through engine-driven V-belt and sheave arrangements. Generally the sheaves are located beneath the tractor or vehicle with the belt drives extending from the engine, beneath the tractor, and to the driven sheaves of the attached implement.

Earth working implements frequently utilize rotating tines or knives to contact, penetrate, dig, turn and work the soil as the tractor and implement are advanced over the soil. Accordingly, the soil and other materials can be thrown by the rotating tines and contact the sheaves and/or belts of the drive arrangement. As this soil and foreign material contacts the sheaves, it may accumulate in the v-shaped grooves of the sheaves and become packed by the pressure exerted by the v-belt. If these implements are operated in wet soil conditions or a type of soil that does not easily fracture and break apart, there is a greater likelihood that the accumulated soil will become packed in the v-groove of a sheave.

Additionally contributing to the problem is the fact that vehicles used with these types of implements are typically smaller and have a low clearance beneath their frames where the sheave and belt drive arrangement is located. The belts and sheaves therefore operate in close proximity to the soil being worked. Further, in wet or muddy soil conditions, the tractor wheels may sink into the soil with the sheaves and belts of the drive arrangement passing into and through the soil, further increasing the likelihood that soil will accumulate in the v-groove of the sheave. When the tractor and implement are operated over uneven ground, the sheaves can also be forced to pass through clumps of soil.

When material does accumulate in the v-groove, a loss of traction between the belt and sheave can occur with an accompanying loss of power to the implement.

In an attempt to prevent soil and other materials from accumulating in the sheaves, guards have been placed adjacent to the sheave v-grooves. While these guards may serve to prevent the entry of some soil into the v-groove, they can not stop all material from entering the groove nor can they act to effectively remove material that does accumulate in the v-groove.

SUMMARY OF THE INVENTION

It would therefore be desirable to provide a means for preventing the build-up of soil and other foreign materials in the v-grooves of sheaves utilized with ground working implements such as rotary tillers. It would further be desirable to provide such a means that would be relatively inexpensive to manufacture, be reliably effective and require little or no maintenance.

Accordingly there is provided a sheave constructed of mating sheave halves, which when joined form a sheave with a v-groove that includes openings in the apex of the v-groove through which soil can be expelled.

There is further provided a sheave wherein the openings in each sheave half may be optionally configured to be circumferentially aligned or off-set from one another. With either configuration, the soil expelling openings are carried below the area in the v-groove that contacts the driven v-belt so that the belt will not contact the openings, which could cause accelerated belt wear.

There is further provided a v-belt sheave design wherein the soil expelling openings are provided directly below the v-belt so that the bottom of the belt serves to exert pressure on the soil or foreign materials that accumulate, thereby tending to force them out of the v-grooves and through the openings.

DESCRIPTION OF THE PREFERRED EMBODIMENT

Figure 1:
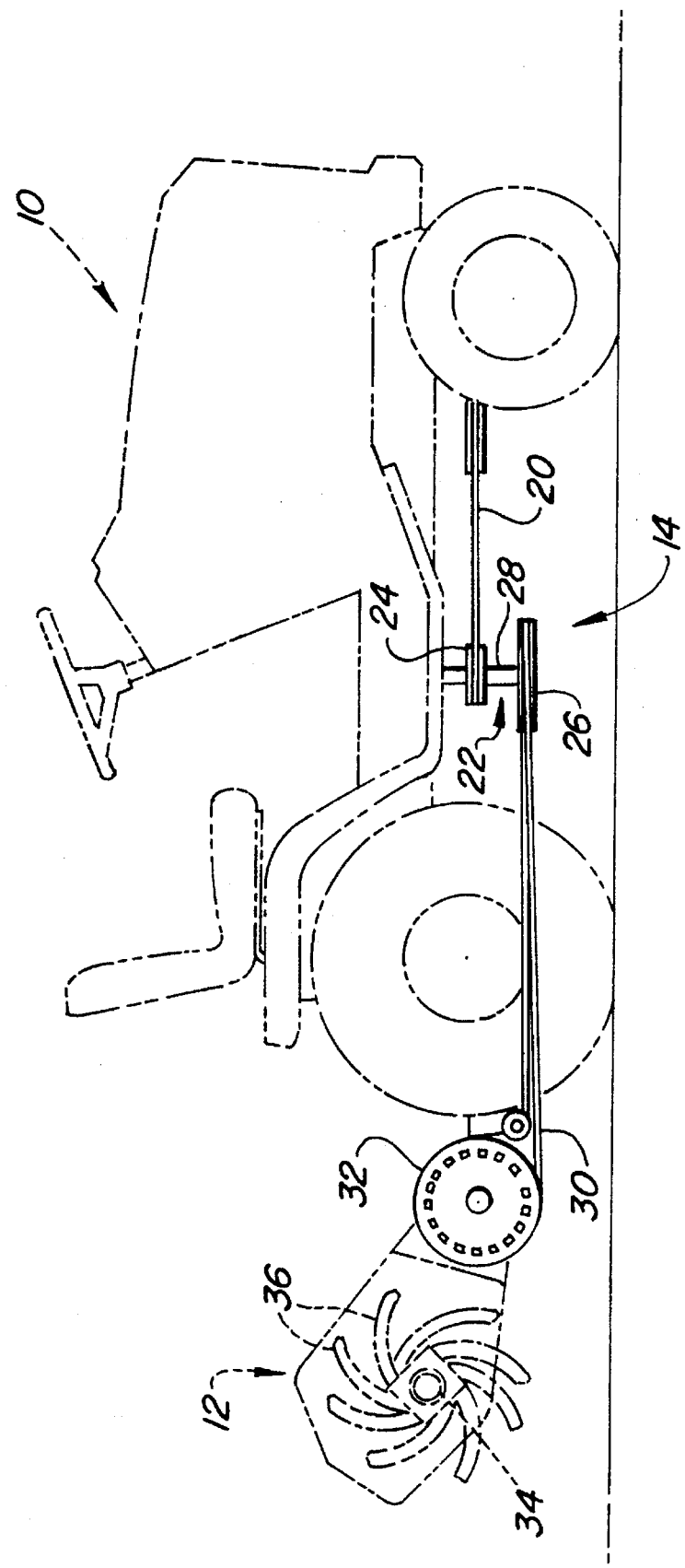
FIG. 1 is a schematic side view of a vehicle, such as a Lawn and Garden Tractor equipped with a small implement such as a rotary tiller, the tiller being driven by a belt and sheave system utilizing the present invention.
Figure 2:
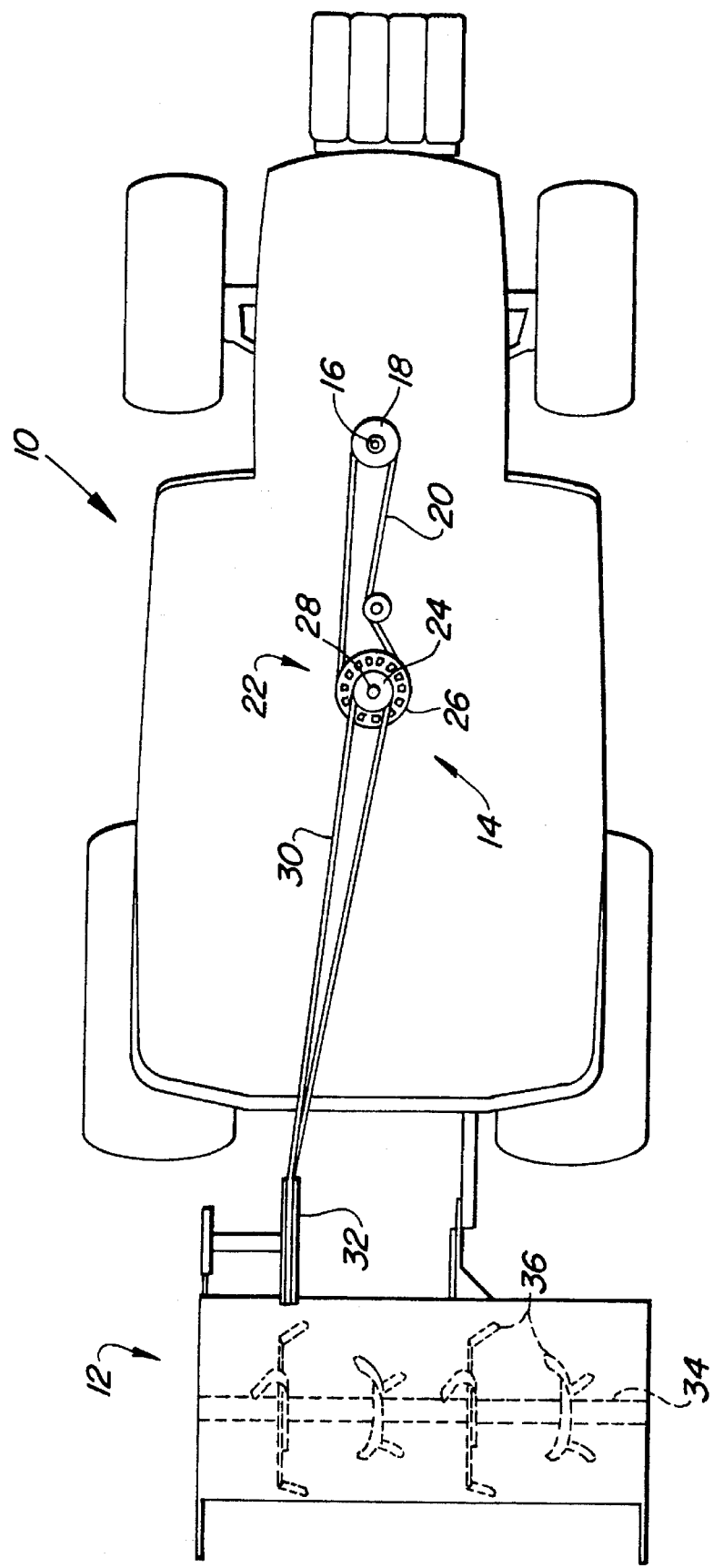
FIG. 2 is a schematic plan view of the tractor, implement and drive arrangement shown in FIG. 1.

Looking first to FIGS. 1 and 2, there is schematically illustrated in respective side and plan views, a tractor 10, a rotary tiller implement 12 and the v-belt drive arrangement 14 carried beneath the tractor 10. The tractor 10 would include an engine, which is unshown, that drives a shaft 16 and sheave 18 near its front end to power a belt 20. That drive belt 20 is connected with a jackshaft 22 carried beneath the operator's portion of the tractor 10 which includes both driven and drive sheaves 24 and 26. The upper sheave 24 on the jackshaft 22 is driven by the engine drive belt 20. As the upper sheave 24 is driven, the shaft 28 of the jackshaft 22 is rotated to power the lower sheave 26. It in turn drives the rear belt 30 that powers the rotary tiller sheave 32. Ground working implements such as the rotary tiller 12 typically include a shaft 34 that carries a plurality of radially extending tines or knives 36. It is these knives or tines 36 which contact and work the soil.

Figure 4:
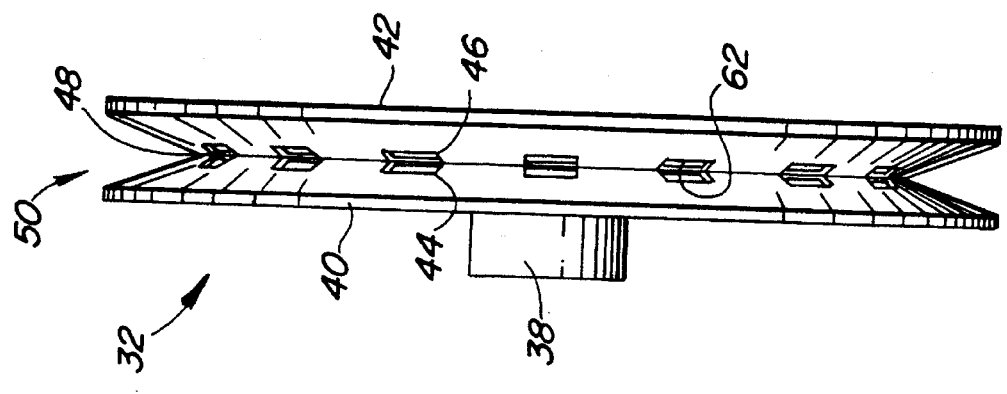
FIG. 4 is a plan view of the sheave illustrated in FIG. 3.
Figure 3:
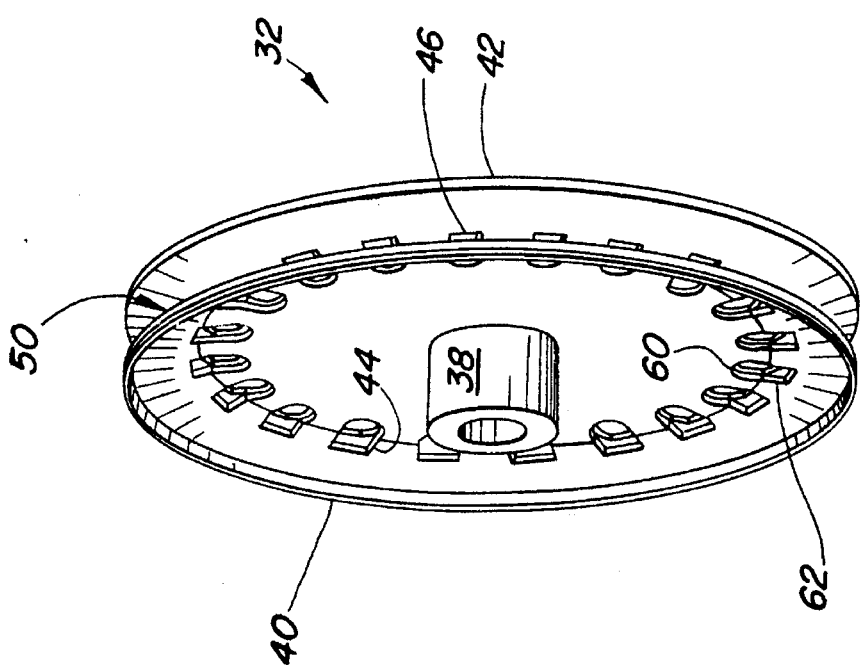
FIG. 3 is a perspective side view of a sheave having circumferentially aligned openings in the two sheave halves.
Figure 5:
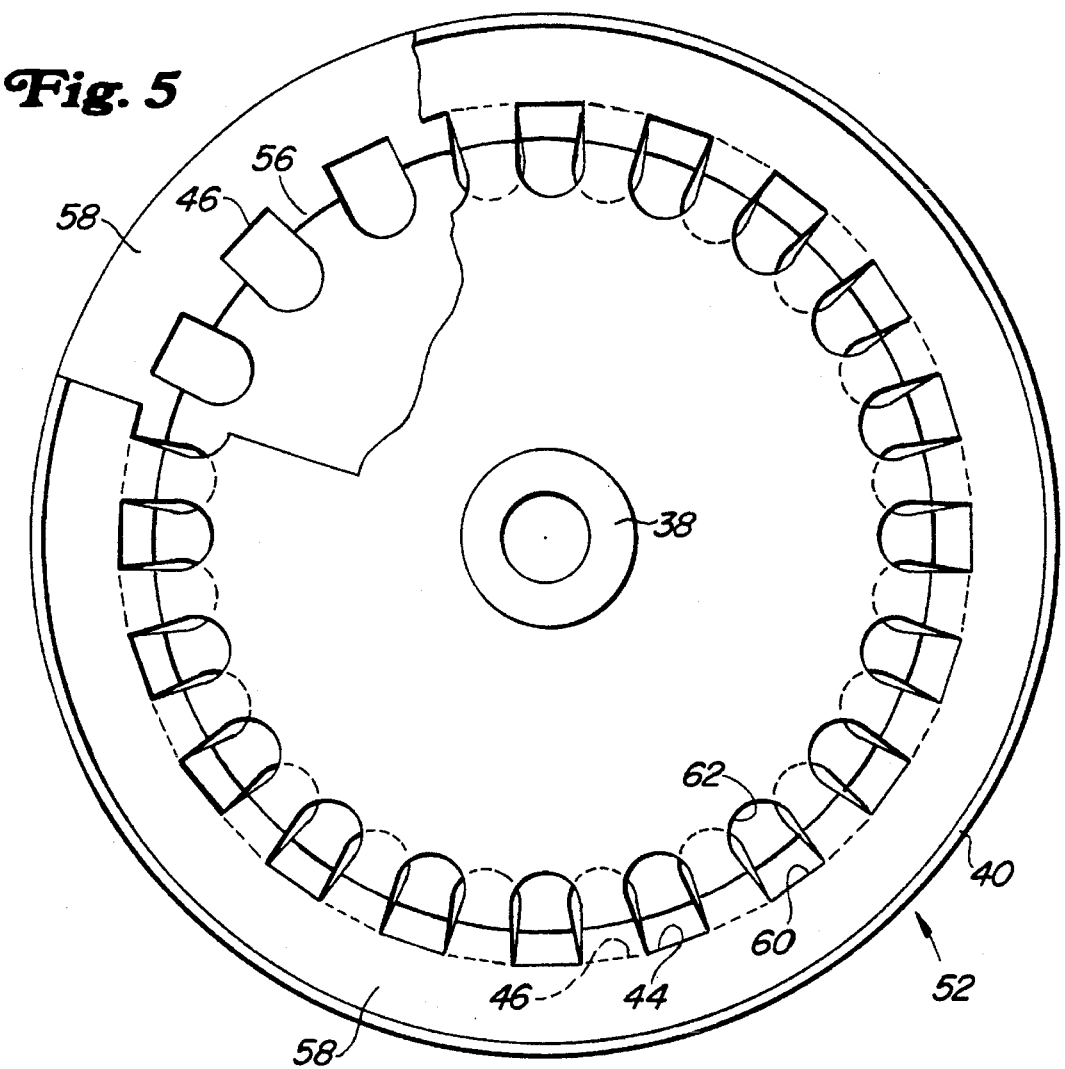
FIG. 5 is a side view of an alternate sheave design having circumferentially alternating openings in the two sheave halves.
Figure 6:
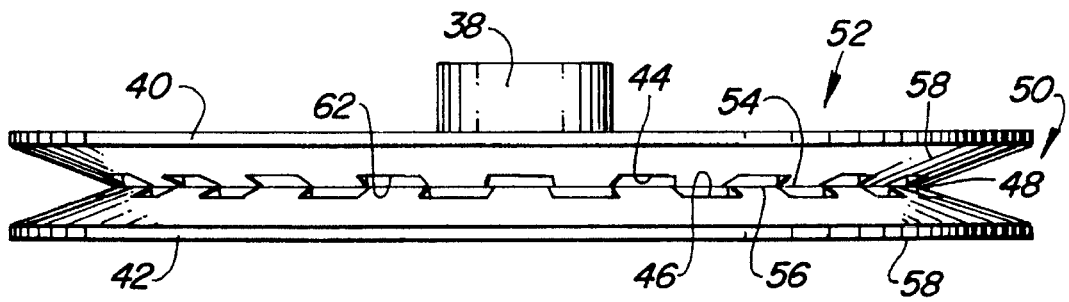
FIG. 6 is a plan view of the sheave illustrated in FIG. 5.
Figure 7:
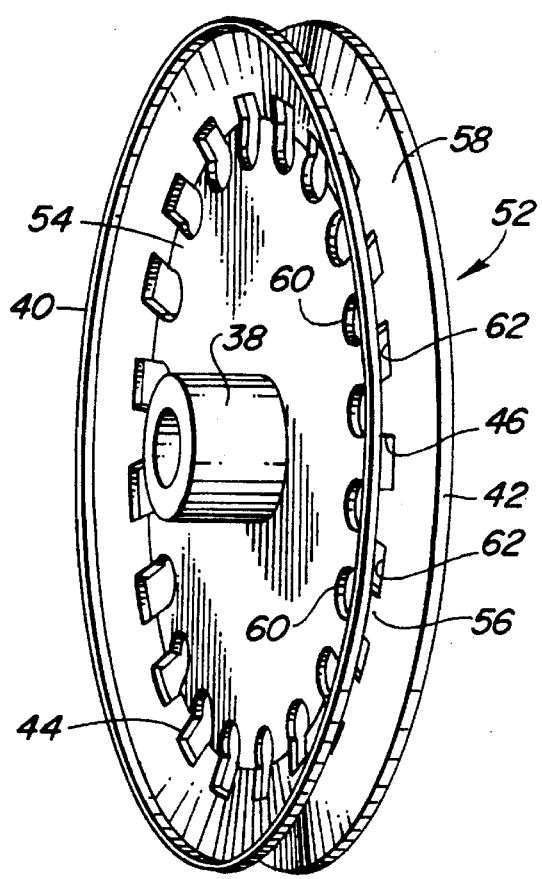
FIG. 7 is a perspective side view of the sheave illustrated in FIGS. 5 and 6.
Figure 9:
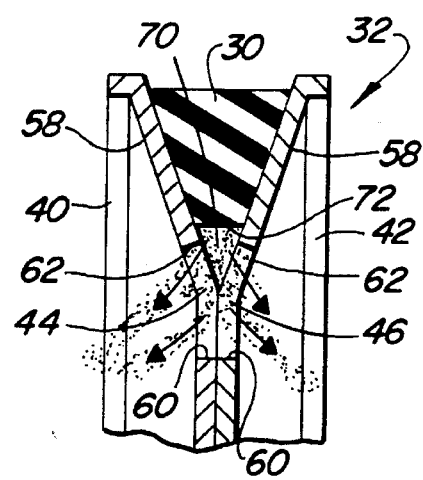
FIG. 9 is a schematic and cross-sectional view of the sheave depicted in FIG. 3, illustrating the downwardly expulsion of soil through the openings.

In FIGS. 3, 4 and 9 there is illustrated the improved and preferred construction of the sheave 32 which includes a central hub 38 and assembled left and right sheave halves 40 and 42. These halves 40 and 42 are essentially mirror-images of one another and can be joined in any conventional manner such as by welding or riveting. Each sheave half 40 and 42 is provided with openings 44 and 46 formed to occupy the apex area 48 of what is the v-belt groove 50 when the sheave halves are assembled. These openings 44 and 46 are circumferentially aligned, as best illustrated in FIG. 4, to provide holes which are not only located at the apex 48 of the v-groove 50, but open out each side of the sheave 32.

The alternative sheave embodiment 52 illustrated in FIGS. 5, 6, 7 and 10 includes the same hub 38 and left and right halves 40 and 42, but positions the openings 44 and 46 in an offset or circumferentially alternating arrangement. As shown, the sheave halves 40 and 42 include the same openings 44 and 46, but the halves 40 and 42 are assembled such that the openings 44 and 46 circumferentially alternate. With this construction, each opening 44, 46 is adjacent a closed portion 54, 56 on the opposite sheave half.

Figure 8:
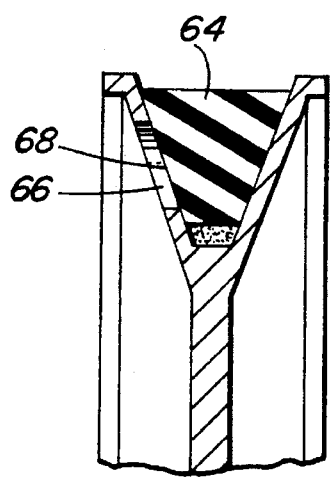
FIG. 8 is a schematic illustration of one prior art sheave wherein openings in the sheave halves are located adjacent the belt track.

The circumferentially spaced apart openings 44 and 46 in either the preferred or alternate sheave construction, 32 or 52 are positioned so that they are adjacent to and spaced radially inwardly of the flange portions 58 that contact the belt of each sheave half. Each opening 44 and 46 includes first and second spaced apart edges 60 and 62 with the first edge 60 being located radially inwardly of the second edge 62. The first edge 60 is also adjacent the apex 48 of the v-groove 50 while the second edge 62 is adjacent the flange portion 58 that contacts the belt 30. In contrast, the belt 64 of the prior art construction depicted in FIG. 8 covers the opening 66 with its side surface 68. To avoid abrasions to the sides of the belt and the resulting excess belt wear, and also permit expulsion of accumulated soil or foreign material, it is important in the construction of the sheave subject of the present invention that the second edge 62 of the openings 44 and 46 be below the flange portion 58 that contacts the belt 30.

In operation, the tractor engine drives a shaft 16 which rotates the forward sheave 18 at the front portion of the tractor 10 and the drive belt 20 which is coupled with the top sheave 24 of the jackshaft 22. The top sheave 24 is coupled to the shaft 28 of the jackshaft 22 and in turn drives the lower sheave 26. The lower sheave 26 drives the belt 30 which is twisted 90° (see FIG. 2), to rotate the vertically oriented drive sheave 32 carried on the earth working implement or tiller 12.

Figure 10:
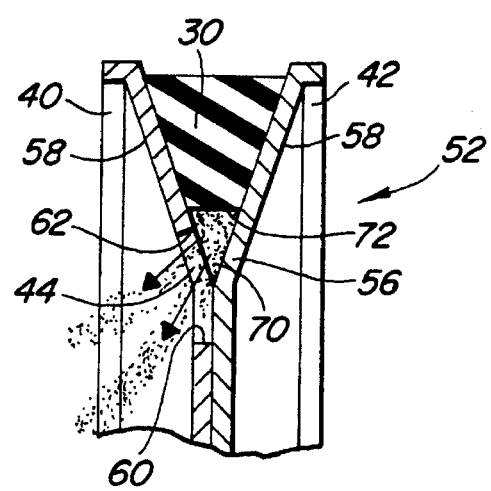
FIG. 10 is similar to the illustration of FIG. 9 but depicting the expulsion of soil from the sheave illustrated in FIGS. 5, 6 and 7.

As this sheave 32 powers the implement drive shaft 34 and the tiller blades 36, the blades 36 engage and penetrate the ground causing some soil and other materials to be thrown. As these materials contact the tiller's drive sheave 32, they may accumulate within the v-groove 50. If the material 70 which accumulates in the v-groove 50 is loose and/or composed of small particles, it may fall through the openings 44 and 46. If it does not fall out, then after it accumulate sufficiently, the bottom of the sheave belt 72 will contact the material 70, and with either embodiment, force it downwardly, as shown in FIGS. 9 and 10, to urge it out through the openings 44 and 46 and to the side of the sheave 32 or 52. Continued pressure by the bottom 72 of the belt 30 on the material 70 accumulating in the apex 48 of the v-belt groove 50 also serves to fracture and break apart accumulated soil so that it more easily passes out and through the openings 44 and 46.

Soil and other foreign materials may accumulate not only in the v-groove 50 of the implement sheave 32 or 52, but also in the lower sheave 26 of the jackshaft 22 when it passes through clumps of soil or foreign material. Soil may also accumulate in this sheave 26 when the tractor wheels sink into wet or soft soil, causing the sheave 26 to dip into the soil. In these situations, the v-groove may quickly fill with soil. Accordingly, it may be desirable to use the present invention not only with a ground engaging implement, but also in the power drive arrangement of the vehicle 10, and particularly on the sheave 26 carried at the lower end of the jackshaft 22. Since the v-belt serves to press on accumulated soil to force it out through the openings, a vertical or horizontal orientation of the sheave should not affect its operation.

With the present invention, there is provided an effective and positive sheave structure for expelling soil and similar foreign materials from the groove of the sheave that should not adversely affect belt life. There is further provided a sheave structure that will assist in assuring sheave and belt contact to minimize loss of friction therebetween and consequent loss of power to the implement. This sheave construction can be particularly helpful when used with ground working implements operated in wet soil conditions and in situations where the tractor power transmission belt sheave arrangement is located close to the ground, subjecting them to contact with uneven and/or wet soil.

I claim:

1. In a sheave having a central hub portion with a transversely extending axis of rotation, first and second flanges carried by the hub portion and radially spaced outwardly therefrom, the flanges diverging from an apex to form a v-shaped groove around the circumference of the sheave that is adapted to receive a belt means, each flange having a portion spaced from the apex that engages the belt means, and means facilitating the expulsion of foreign material from the groove including circumferentially spaced-apart openings carried in the sheave, the openings being adjacent to the flange portions and spaced radially inwardly therefrom.

2. The invention defined in claim 1 wherein each opening has first and second spaced apart edges, the first edge being radially inwardly of the second edge and adjacent the apex of the groove with the second edge being inwardly spaced of the flange portions.

3. The invention defined in claim 2 wherein the first edge is spaced radially inwardly of the apex and the second edge is spaced outwardly of the apex.

4. The invention defined in claim 1 wherein the belt means includes a surface that is adapted to contact foreign material carried in the groove and force it out through the openings.

5. The invention defined in claim 1 wherein the openings are carried in one flange.

6. The invention defined in claim 1 wherein the openings are provided in both flanges, with circumferentially adjacent openings alternating between the flanges.

7. The invention defined in claim 1 wherein the sheave is comprised of two halves, each half carrying one flange.

8. In a sheave having a central hub portion with first and second flanges carried radially outwardly therefrom, the flanges diverging outwardly from an apex to form a v-shaped groove around the circumference of the sheave that is adapted to receive a belt means, each flange having a wall portion spaced from the apex that engages the belt means, and spaced apart openings carried in the flanges, said openings being circumferentially spaced around the sheave with the openings of each flange being aligned with the openings of the other flange, said openings also being adjacent to and inwardly spaced of the flange wall portions.

9. The invention defined in claim 8 wherein each opening has first and second spaced apart edges, the first edge being radially inwardly of the second edge and adjacent the apex of the groove with the second edge being inwardly spaced of the flange wall portions.

10. The invention defined in claim 8 wherein the first edge is spaced radially inwardly of the apex and the second edge is spaced outwardly of the apex.

11. The invention defined in claim 8 wherein the belt means includes a surface that is adapted to contact foreign material carried in the groove and force it through the openings.

* * * * *